US008201682B2

(12) United States Patent
DeVries

(10) Patent No.: US 8,201,682 B2
(45) Date of Patent: Jun. 19, 2012

(54) CONVEYOR BELT CLEANING APPARATUS AND METHOD

(75) Inventor: Brett E. DeVries, Comstock Park, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 282 days.

(21) Appl. No.: 12/581,017

(22) Filed: Oct. 16, 2009

(65) Prior Publication Data

US 2010/0116621 A1    May 13, 2010

Related U.S. Application Data

(60) Provisional application No. 61/196,483, filed on Oct. 17, 2008.

(51) Int. Cl.
*B65G 45/16* (2006.01)
(52) U.S. Cl. ........................................................ 198/499
(58) Field of Classification Search .................. 198/497, 198/499
See application file for complete search history.

(56) References Cited

U.S. PATENT DOCUMENTS

| 4,795,024 | A  | * | 1/1989 | Eatwell ......................... 198/499 |
| 5,007,523 | A  |   | 4/1991 | Morefield |
| 6,581,754 | B2 |   | 6/2003 | Law |
| 6,874,616 | B2 |   | 4/2005 | DeVries et al. |
| 7,093,706 | B2 |   | 8/2006 | DeVries et al. |
| 7,216,756 | B2 | * | 5/2007 | Swinderman ................. 198/499 |

OTHER PUBLICATIONS

International Search Report issued in corresponding PCT Application No. PCT/US2009/61083 dated Dec. 3, 2009.

* cited by examiner

*Primary Examiner* — James R Bidwell
(74) *Attorney, Agent, or Firm* — Fitch Even Tabin & Flannery, LLP

(57) ABSTRACT

Spring tensioner devices are provided for biasing scraper blades toward a conveyor belt. The spring tensioner devices generally are constructed to be easily reconfigurable between a push-up and pull-up configuration while minimizing their space requirements.

27 Claims, 16 Drawing Sheets

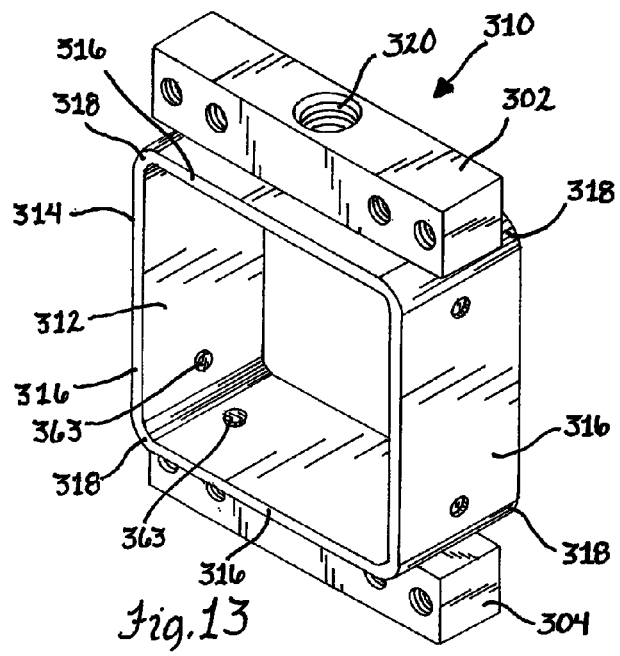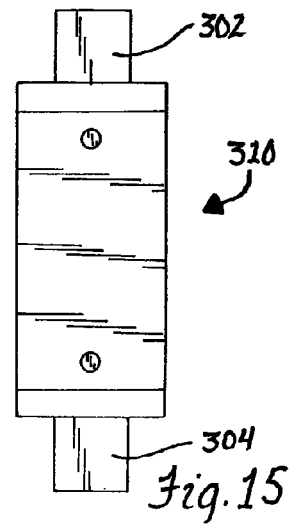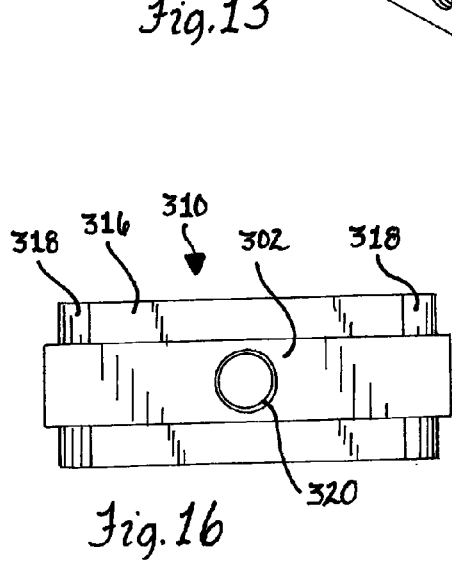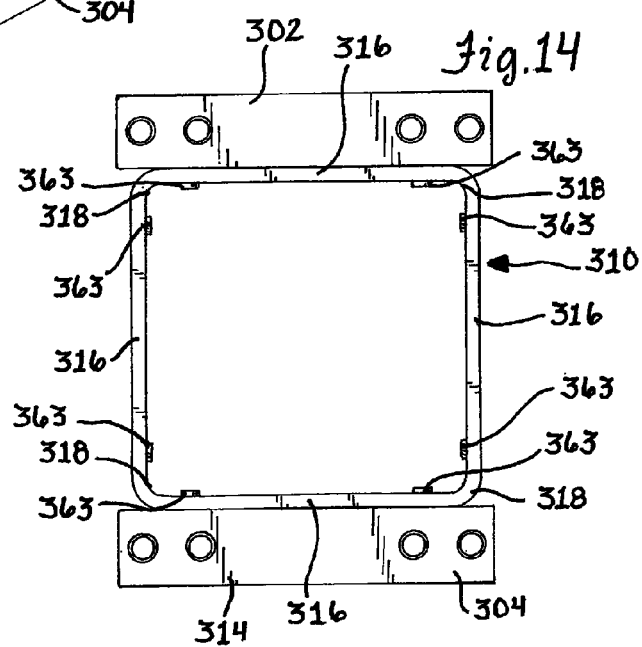

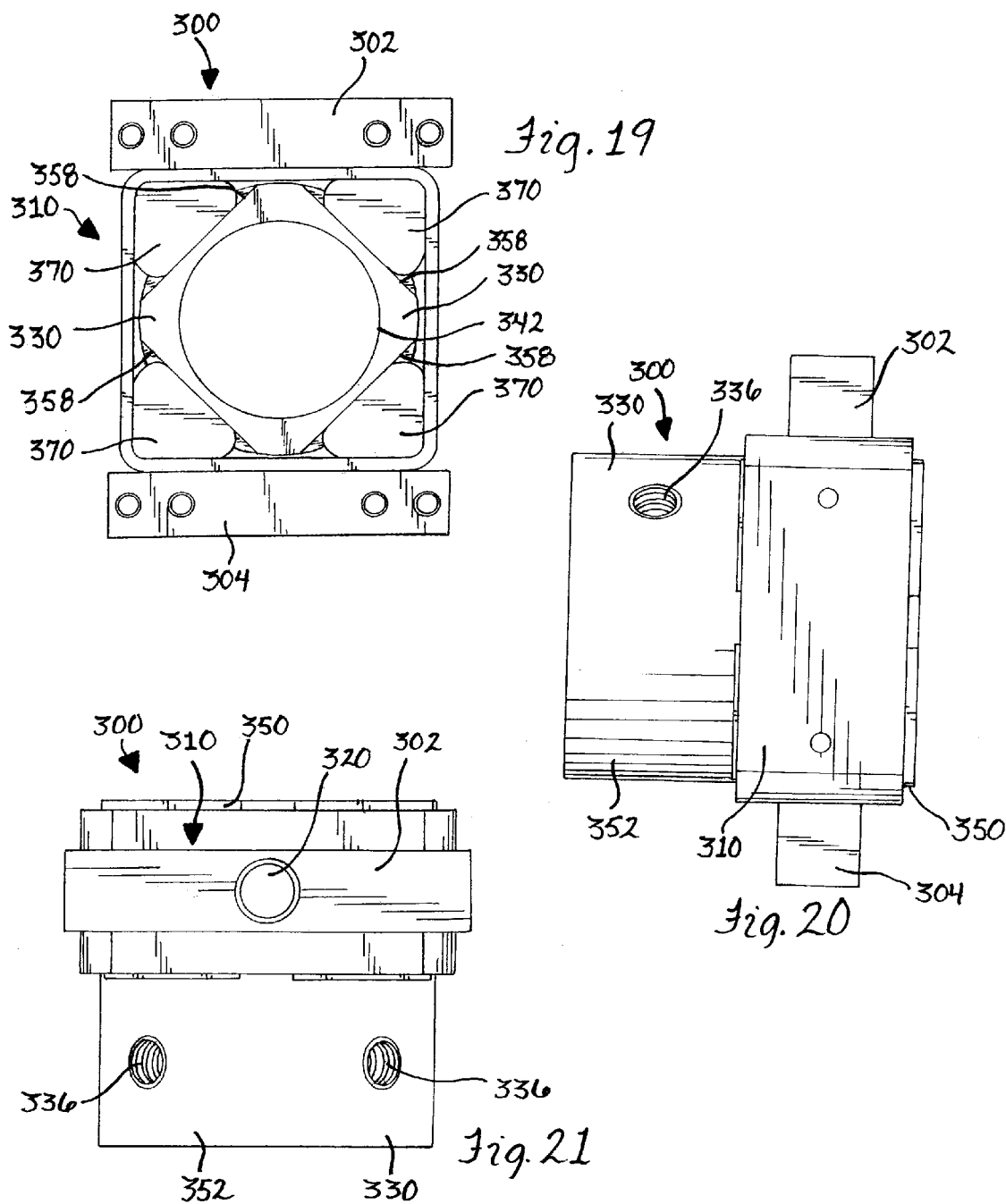

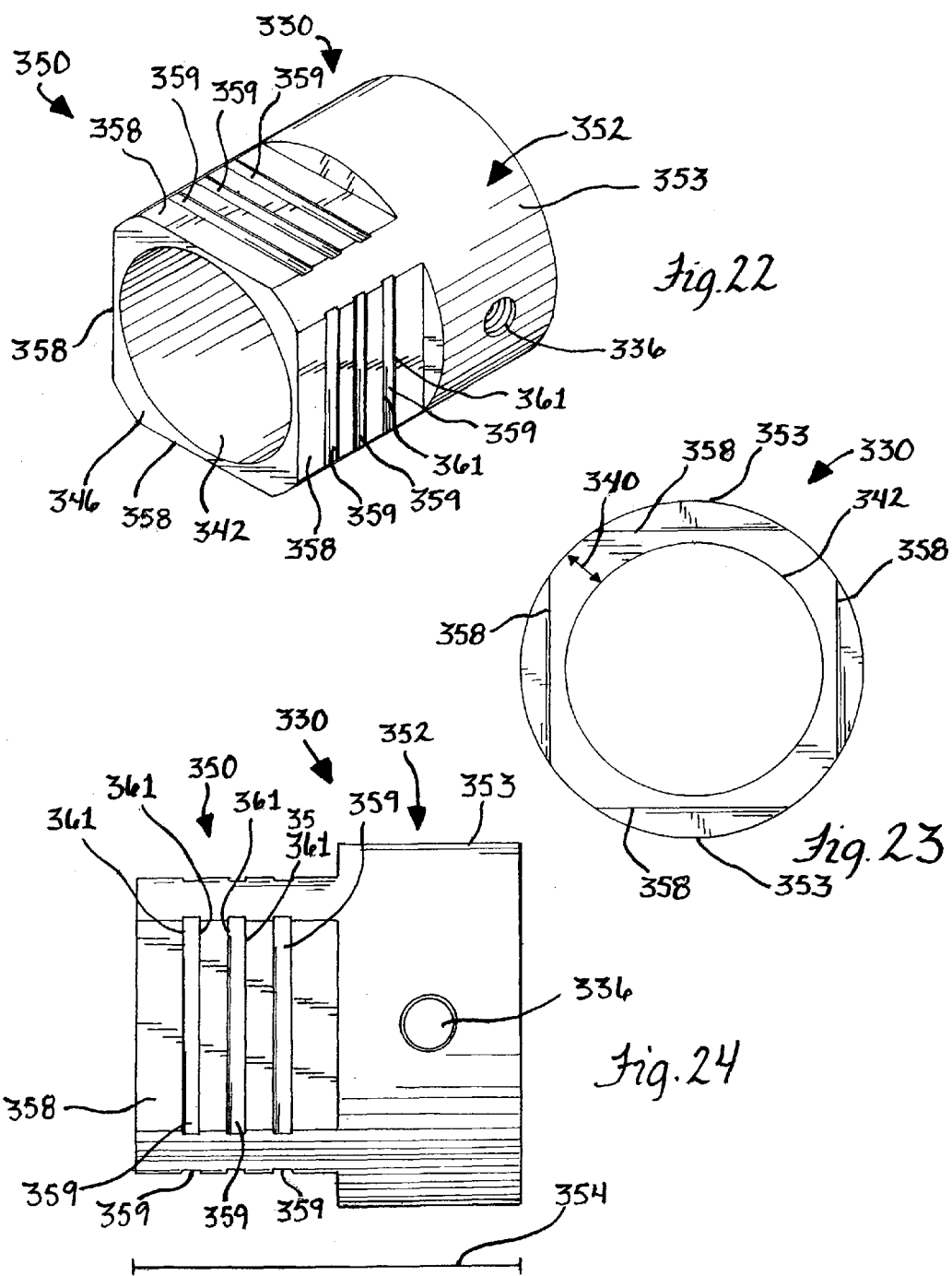

CONVEYOR BELT CLEANING APPARATUS AND METHOD

CROSS REFERENCE TO RELATED APPLICATION

This application claims the benefit of the filing date of U.S. Provisional Application 61/196,483 filed Oct. 17, 2008, which is hereby incorporated in its entirety herein.

FIELD OF THE INVENTION

The invention relates to a belt cleaning apparatus and, more particularly, to a reconfigurable spring tensioner for a conveyor belt cleaning apparatus and method for reconfiguring such an apparatus.

BACKGROUND OF THE INVENTION

Conveyor belts are used in a variety of industries (e.g., coal, aggregate, packaging) to transport goods and materials. Based on the material transported and the ambient conditions surrounding the conveyor belt, material can become undesirably affixed to the belt. The material can be removed from the belt in a number of ways, including, but not limited to the use of a belt cleaning apparatus utilizing spring tensioners.

A belt cleaning apparatus cleans the belt in place, during operation, via a scraping action thereagainst. A belt cleaning apparatus typically will include a cleaner blade or blades having a scraper or tip end that is biased into engagement with the belt surface, usually on the return run of the belt (secondary belt cleaners) or at the head pulley (primary belt cleaners). In either type of belt cleaner, the scraper blade will typically be mounted to an elongate pole extending below and across the belt to the frame structure of the conveyor system on either side of the belt for being operatively supported thereby. In this regard, the opposite ends of the pole can be mounted to biasing units secured to frame structures for providing an upward bias force for urging the scraper blade into engagement with the belt surface.

Exemplary prior art spring tensioner units are disclosed in U.S. Pat. Nos. 6,874,616 to DeVries and 7,093,706 to DeVries, which are incorporated as if reproduced in their entirety herein. These units provide both a rotary bias force and an upward, linear bias force to the pole via a Rosta-type torsion biasing mechanism and a spring loaded housing assembly of the torsion biasing mechanism. Depending on space requirements, the tensioner units are mounted to the conveyor frame structure with either a pull-up or push-up configuration. In the pull-up configuration the coil spring providing the linear bias force is arranged on the fixed mounting frame flange above the housing assembly mounted for translation along the mounting frame member to exert an upward bias force that draws or pulls the housing assembly upward. In the push-up configuration the tensioner unit is rotated 180 degrees about the longitudinal axis of the mounting pole. In this configuration, the coil spring is arranged below the housing assembly and between the fixed mounting frame flange and the translatable housing assembly to exert an upward bias force that pushes the housing assembly upward. However, switching from one configuration to another requires significant disassembly and re-assembly of the unit.

More particularly, the coil spring has to be reoriented relative to the mounting frame flange of the unit against which the spring abuts. To do this, the entire housing assembly is detached from the guide bearings on the mounting bracket. This allows the position of the spring to be changed from one side of the bracket flange to the other with the housing assembly then reconnected to the linear guides on the bracket once the spring is properly positioned. The disassembly required for reconfiguring the tensioner units is undesirable from a time and labor standpoint.

Accordingly, there is a need for a spring tensioner that can be more easily reconfigured between pull-up and push-up configurations.

SUMMARY OF THE INVENTION

In accordance with one aspect of the invention, a tensioner unit for a belt scraper is provided that is easily reconfigurable between push-up and pull-up configurations thereof. In this regard, changing the configuration of the present tensioner unit does not require significant disassembly of the tensioner unit for reconfiguration thereof.

For instance, instead of having to disconnect a housing assembly of the tensioning unit from its mounting frame member to which it is slideably mounted, the mounting frame member includes a detachable portion that is easily removed from the mounting frame member allowing the housing assembly to stay connected thereto for reconfiguration of the tensioner unit.

In a preferred form, the tensioning units have a spring member that provides a linear bias force upwardly to the housing assembly. The detachable portion of the Mounting frame member is a spring mount against which one end of the spring is seated. Thus, removing the spring mount allows the position of the spring relative to the housing assembly and mounting frame member to be easily changed while keeping the housing assembly connected to the slide bearings on the mounting frame member.

In one form, the housing assembly receives an end portion of an elongate member secured therein. The elongate member extends under and across the conveyor with a belt scraper mounted to the elongate member. A rod is fixed to the housing assembly and extends upwardly therefrom in the pull-up configuration, and downwardly therefrom in the push-up configuration with the spring being a coil spring seated with its coils extending about the rod. In this manner, the spring is operable to bias the belt scraper toward the conveyor belt in scraping engagement therewith.

In another aspect, a method of reconfiguring a spring tensioner unit between push-up and pull-up configurations is provided. The method includes removing either a spring from the rod or a spring support member from a wall of the unit, depending on the configuration of the unit. After both of these steps, the unit is reoriented and the spring is able to be mounted back on the rod without requiring that it be removed from the unit such as with prior spring tensioners that required the rod along with the housing assembly to which it is attached to be removed from the wall of the mounting frame of the tensioner unit for this purpose. Then, both the spring is replaced on the rod and the spring support is mounted onto the wall of the unit, the order of which depending on the configuration of the unit.

More specifically, in the push-up configuration, the spring is positioned between the housing assembly and the mounting plate detachable portion. In the pull-up configuration, the mounting plate detachable portion is positioned between the spring and the housing assembly, the spring positively secured on the rod, such as with a nut. As such, the tensioning units can be reconfigured between the push-up and pull-up configurations by removing and reconfiguring the spring, securing member and the mounting plate detachable portion without having to manipulate the housing assembly or the rod extending therefrom relative to the mounting plate.

Additionally, the configuration of the prior art spring tensioner, in particular the overall size and the different mounting footprints depending on the configuration utilized, presented obstacles in maintaining and installing a spring tensioner in applications without ample space. While possible to minimize the space requirements by minimizing the potential travel of the housing mechanism or by reducing the spring size, operating the spring tensioner in such a manner limits the operational effectiveness of the spring tensioner.

In accordance with another aspect of the invention, a spring tensioner is provided having a compact design. The spring tensioner includes a housing assembly for supporting an elongate member extending below the belt. The housing assembly is attached to a vertical wall portion of a mounting plate by a linear guide device which permits the housing assembly to shift in a vertical direction along the plate. The spring tensioner further includes a rod extending from the housing assembly about which a biasing mechanism of the spring tensioner is positioned. The rod extends through a horizontal ledge extending from the vertical wall portion of the mounting plate.

In a preferred form, the horizontal ledge of the mounting plate includes a horizontal seat portion against which the biasing mechanism abuts. Extending from the horizontal seat portion is a pair of vertical walls between which the biasing mechanism can be received. In one form, the horizontal ledge includes an opening aligned with the rod and a mounting member extending across the opening including the horizontal seat portion and the vertical walls.

By including the vertical walls of the mounting member the overall size of the spring tensioner unit is decreased. First, the height of the mounting frame can be decreased by an amount equal to the size of the vertical walls as will be discussed further below. Additionally, the rod can also be reduced in length by an amount up to two times the size of the vertical walls as will be discussed further below. Therefore, the presence of the vertical walls of the mounting member can reduce the overall height of the spring tensioner unit by approximately at least twice the height of the step.

In another embodiment of the invention, a spring tensioner unit is provided having a reduced size. In particular, the housing assembly of the spring tensioner which receives the pole extending below and across the belt is configured to have a minimized size. The housing assembly includes an inner housing for receiving the pole extending across the belt. An outer housing that is disposed about a portion of the inner housing is configured to be slideably mounted on the mounting frame. Resilient members are further positioned between the inner housing and outer housing to resist torsional movement of the inner housing and prevent engagement of the inner and outer housings.

In a preferred form, the inner housing is configured to include a varying wall thickness. By reducing the wall thickness of the inner housing against which the resilient members abut, the outer housing can be reduced in size. As a result, the mounting frame of the spring tensioner can further be reduced in size. In one embodiment, the inner housing has an annular inner surface with varying wall thicknesses. In another embodiment, the inner housing has an annular outer surface portion with flat sections formed therein.

There are several advantages of having a smaller spring tensioner unit with strength comparable to a larger unit. The first advantage is ease of installation and maintenance on the spring tensioner unit. Additionally, given that spring tensioner units are usually installed below conveyor belts, in areas which there are space restraints, a smaller sized spring tensioner unit would permit a user to install a belt cleaner where it would otherwise be infeasible.

BRIEF DESCRIPTION OF THE DRAWINGS

FIG. 13 is a perspective view of the outer housing of the spring tensioner of FIG. 1 showing the square housing, the upper and lower guide blocks attached to the upper and lower surfaces of the square housing and the guide block aperture to receive the threaded rod;

FIG. 14 is a front elevational view of the outer housing of the spring tensioner of FIG. 1;

FIG. 15 is a side elevational view of the outer housing of the spring tensioner of FIG. 1;

FIG. 16 is a top plan view of the outer housing of the spring tensioner of FIG. 1 showing the upper guide block aperture;

FIG. 19 is a back elevational view of the housing assembly of the spring tensioner of FIG. 1 showing the annular inner surface of the housing assembly and the annular and non-annular outer surfaces of the inner housing;

FIG. 20 is a side elevational view of the housing assembly of the spring tensioner of FIG. 1 showing the inner housing extending from the outer housing;

FIG. 21 is a top plan view of the housing assembly of the spring tensioner of FIG. 1 showing the aperture of the upper guide block;

FIG. 22 is a perspective view of the inner housing of the spring tensioner of FIG. 1 showing the annular outer surface portion and non-annular outer surface portion;

FIG. 23 is a front elevational view of the inner housing of the spring tensioner of FIG. 1 showing the annular inner surface and non-annular outer surface portion; and FIG. 24 is a side elevational view of the inner housing of the spring tensioner of FIG. 1 showing the height difference between the annular outer surface which extends from the outer housing and the non-annular outer surface portion which is received in the outer housing.

DETAILED DESCRIPTION OF THE PREFERRED EMBODIMENTS

Figure 1:
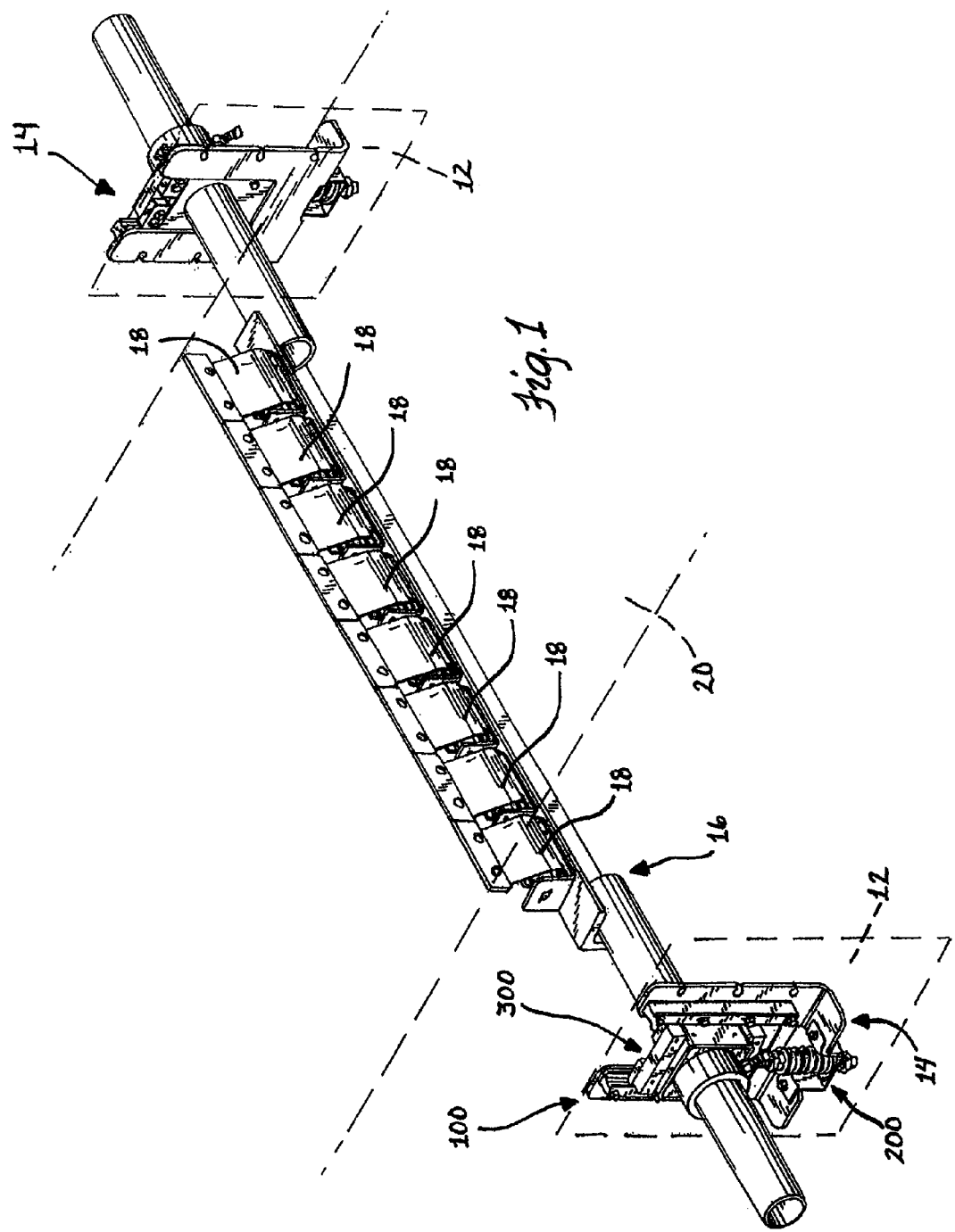
FIG. 1 is a perspective view of the conveyor belt cleaning apparatus, including a frame, a plurality of belt cleaners, an elongate member, a pair of spring tensioner units in the push-up configuration, and a belt and support frame in phantom.

In FIG. 1, a belt cleaning system is shown having an elongate support member 16 supported on either end by spring tensioners 14. The spring tensioners are configured to be easily reconfigurable between pull-up 208 and push-up 210 configurations. To accommodate an easy reconfiguration of the spring tensioner, the sprint tensioner includes a detachable portion 120 of a mounting frame 100 to permit easy reconfiguration of the biasing mechanism 200, such as a spring 204, in relation to the mounting frame 100. A further advantage of a reduced overall size of the spring tensioner 14 is realized by a bracket configuration 126 of the detachable mounting member 120 as will be discussed further below.

As shown in FIGS. 1-7, the mounting frame 100 includes a vertical plate portion 104 and a shelf portion 106 extending transversely from the vertical plate portion 104. The vertical plate portion 104 is configured to be secured to a support frame 12 and includes a pair of parallel leg portions 105 defining a U-shaped configuration of the mounting plate portion 104. The U-shaped configuration permits the elongate member 16 to extend between the leg portions 105 and travel vertically therebetween.

A linear guide device 102 of the vertical plate portion 104 provides a connection for a housing assembly 300 and permits linear translation of the housing assembly 300 along the vertical plate portion 104 of the mounting frame 100. As shown in FIGS. 1-3, 6 and 7, the mounting frame 100 includes linear guides 108 of the linear guide device 102 positioned along each leg 105 of the mounting frame 100 and the housing assembly 300 includes laterally extending guide blocks 302 and 304 having slide members 303 and 305 to be received in guide channels 108 of the linear guide device 102.

The housing assembly 300 has two end positions based on the housing assembly's linear translation along the mounting frame 100. In a first end position the housing assembly 300 is fully translated toward a shelf wall 106. In a second end position the housing assembly 300 is translated to its farthest point from the shelf 106. Preferably the housing assembly 300 has a limited linear translation distance, such as approximately two inches.

As shown in FIGS. 1-7, the shelf portion 106 includes an opening or notch 122 therein located generally centrally along the shelf portion 106 so that a rod 202 extending from a housing assembly 300 of the spring tensioner 14 extends through the opening 122. In contrast, the prior art spring tensioners, as shown in FIGS. 8, 9, 10 and 12, include a shelf portion which extends uninterrupted along the width of the mounting frame 100.

The detachable mounting member 120 of the shelf 106 is configured to be detachably connected to the shelf portion 106 and extend across the opening 122. As shown in FIGS. 2, 3, 6 and 7, the shelf 106 includes a pair of apertures 142, one located on either side of the notch 122. The mounting member 120 is configured to include a corresponding pair of apertures 140, through which a fastener 207 can be positioned to detachably connect the mounting member 120 to the shelf 106.

Figure 3:
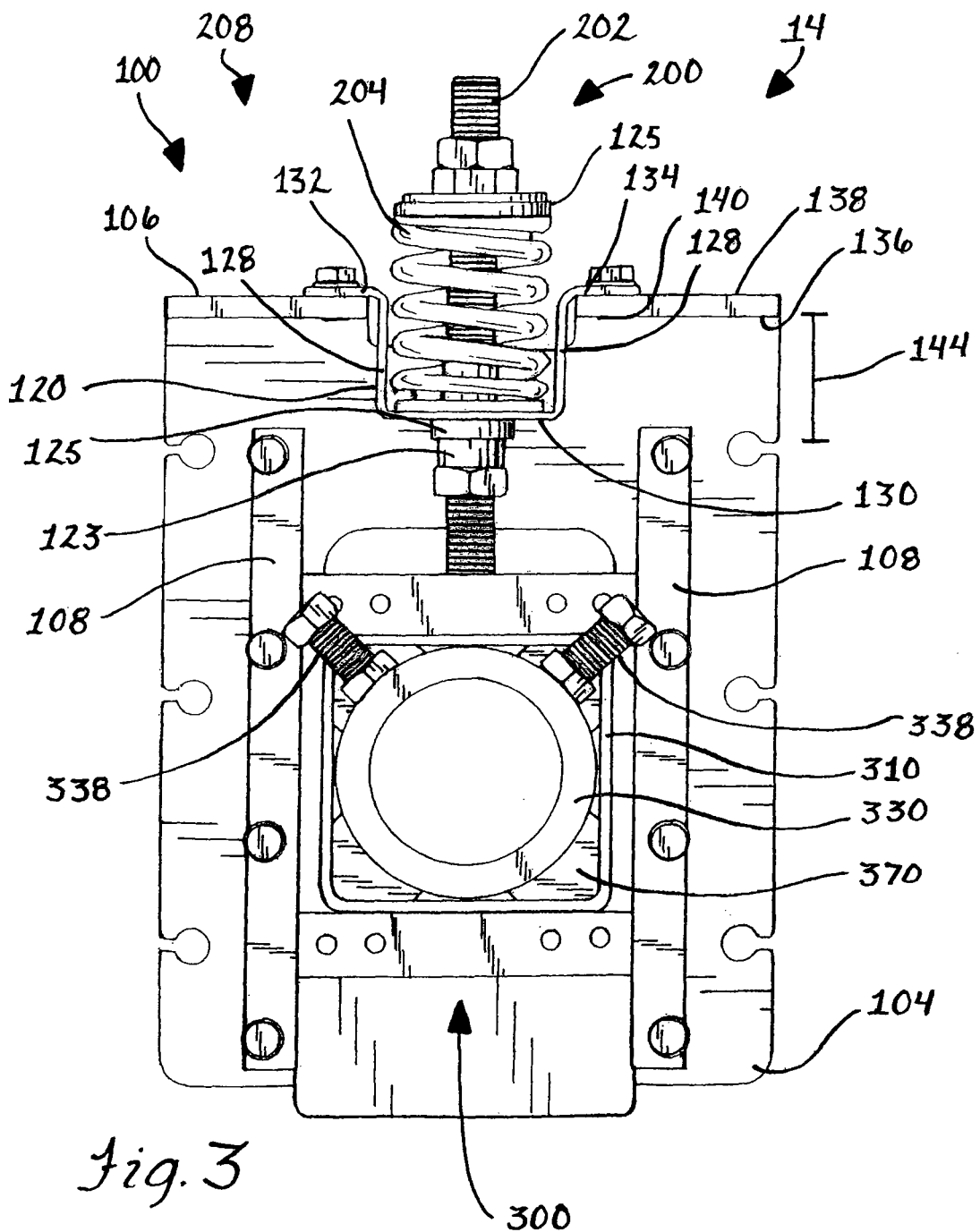
FIG. 3 is a front elevational view of the spring tensioner of FIG. 1 in the pull-up configuration.
Figure 4:
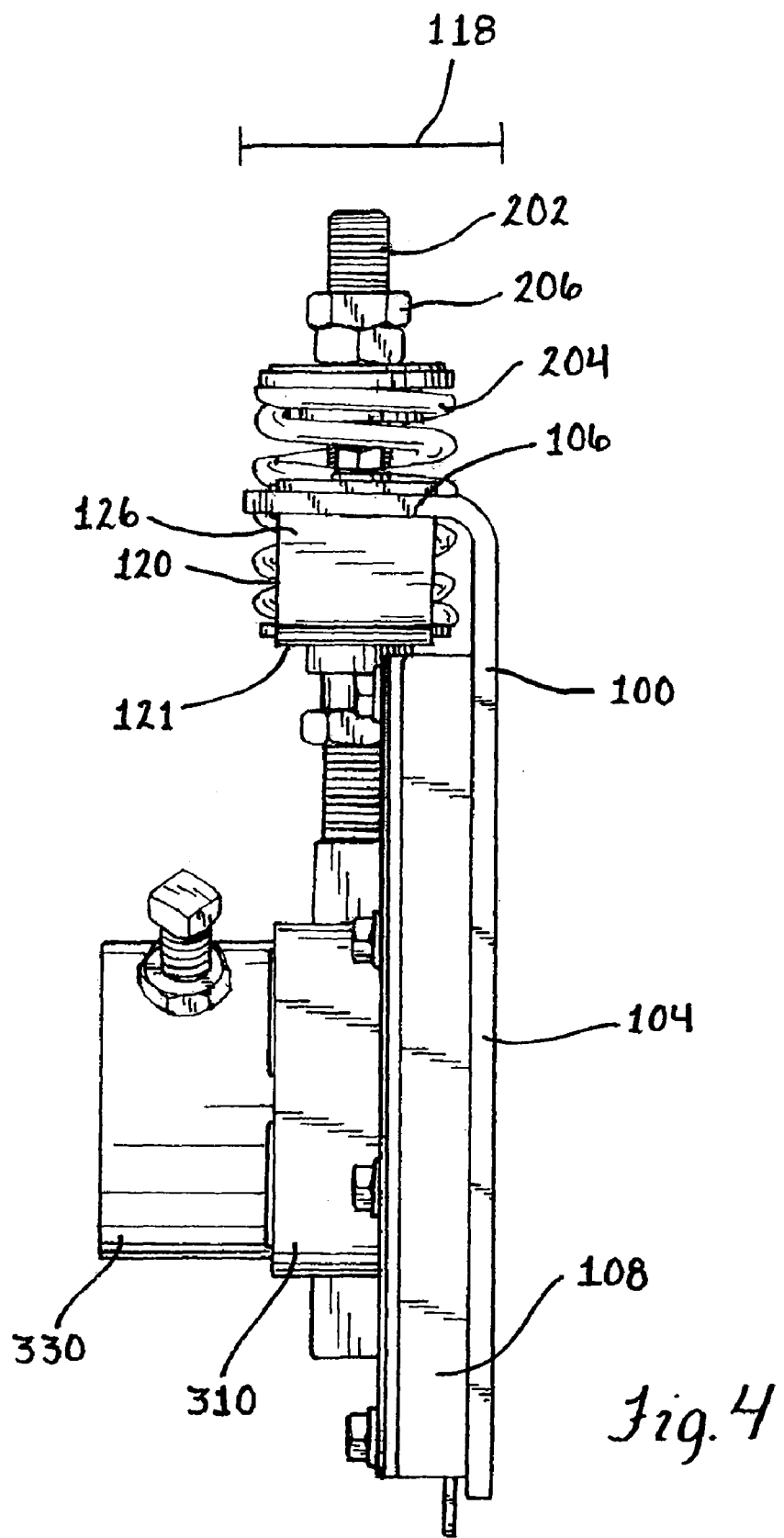
FIG. 4 is a side elevational view of the spring tensioner of FIG. 1 in the pull-up configuration showing the inner housing portion extending from the outer housing portion having an annular outer surface.
Figure 5:
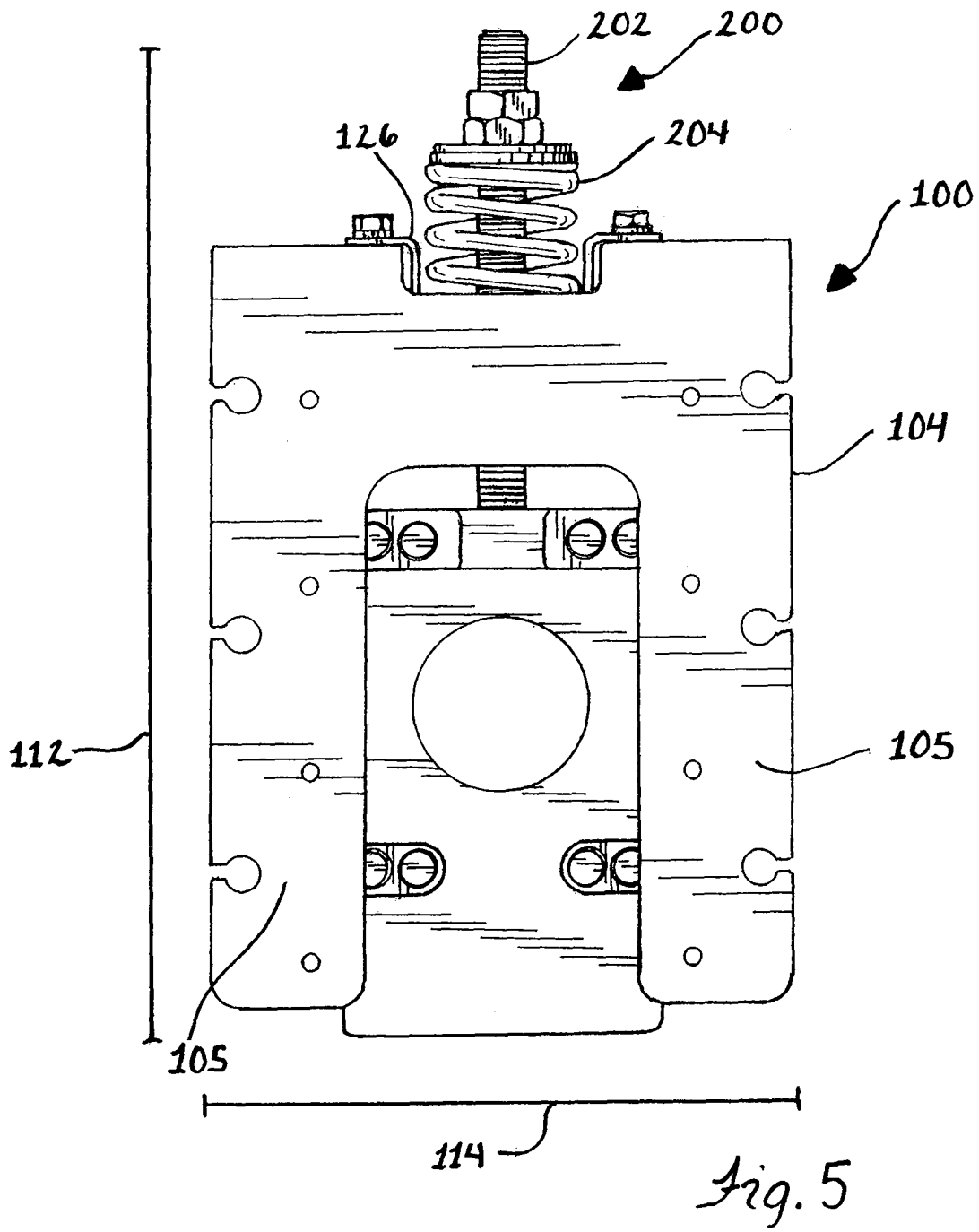
FIG. 5 is a back elevational view of the spring tensioner of FIG. 1 in the pull-up configuration showing the mounting frame having a U-shaped configuration to provide free vertical movement of the elongate pole therethrough.
Figure 7:
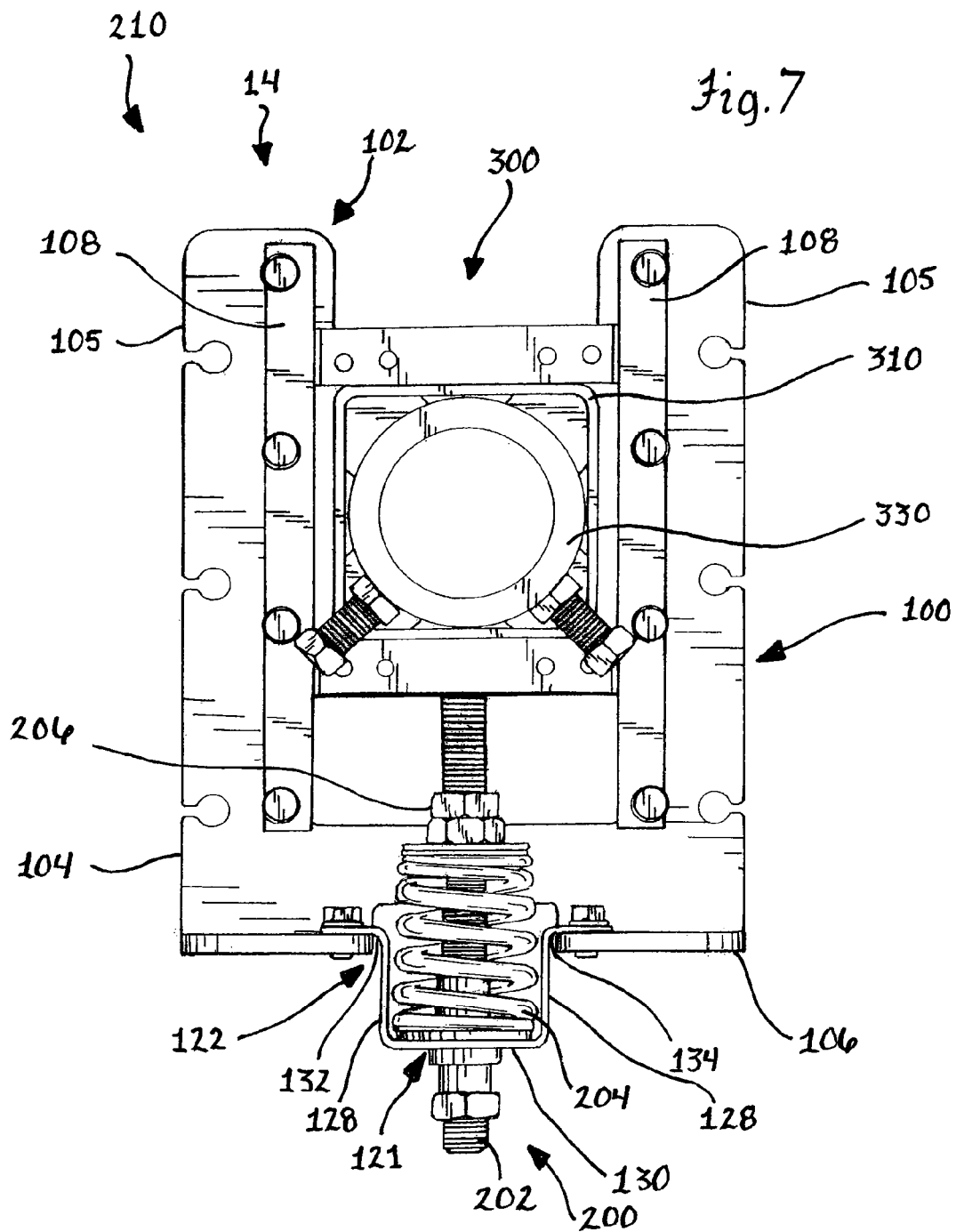
FIG. 7 is a front elevational view of the spring tensioner of FIG. 1 in the push-up configuration showing the sleeve member disposed about the threaded rod and extending through the bracketed mounting member.
Figure 8:
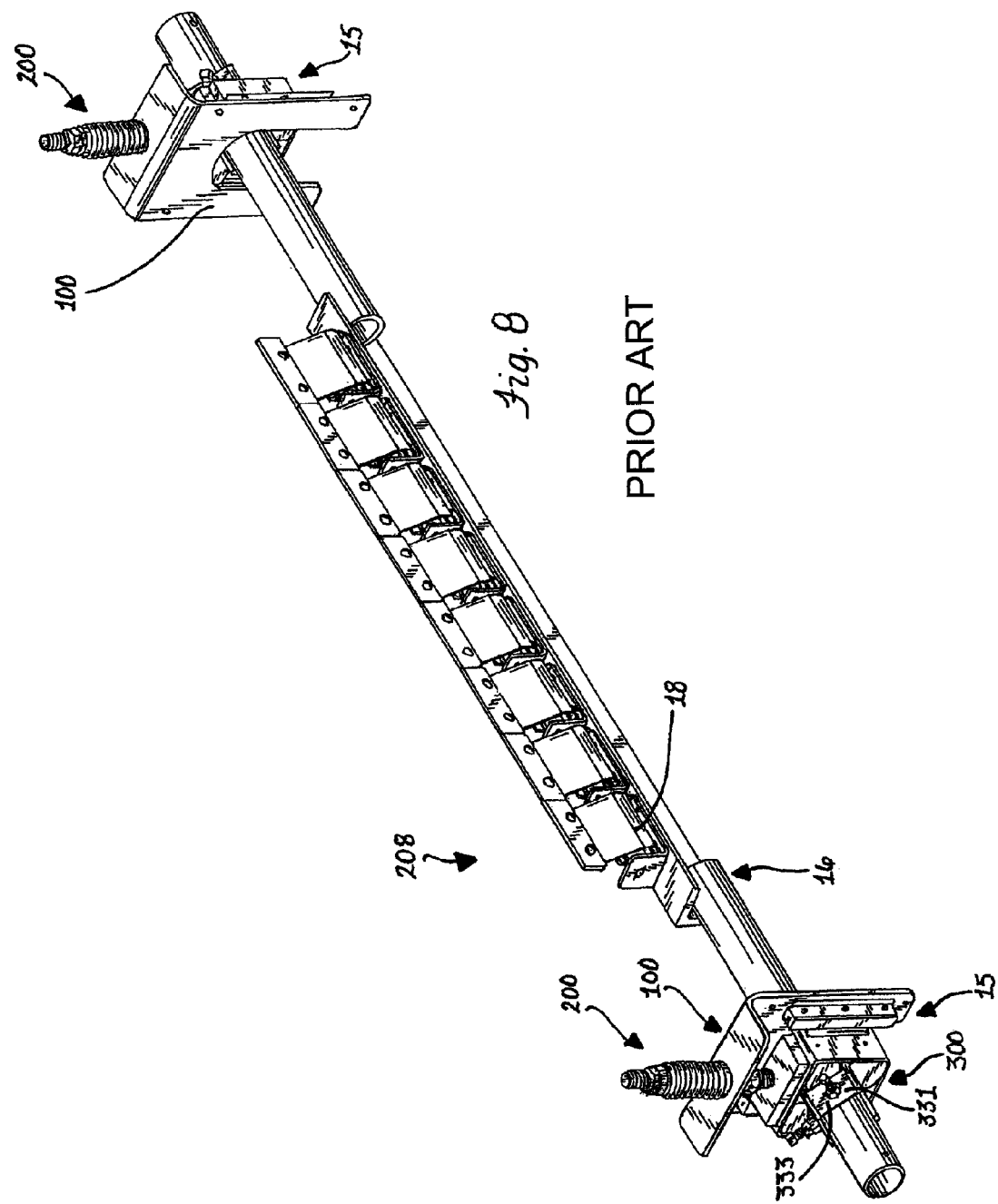
FIG. 8 is a perspective view of a prior art belt cleaning apparatus including a plurality of belt cleaners, an elongate pole and a pair of spring tensioner units in the pull-up configuration.
Figure 9:
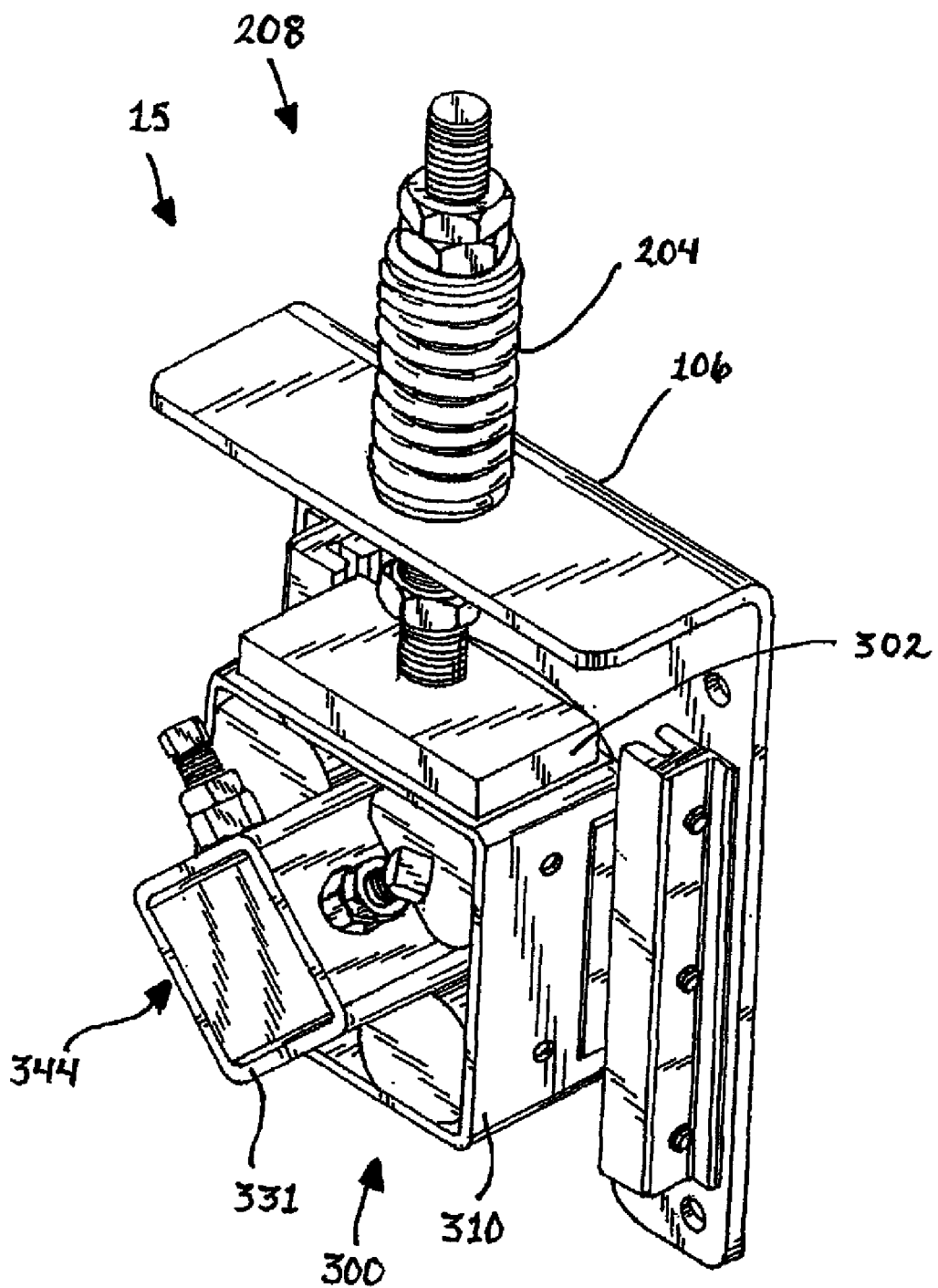
FIG. 9 is a perspective view of the prior art spring tensioner unit of FIG. 8 in the pull-up configuration showing the square tube inner housing of the housing assembly and a one-piece mounting frame including a transverse ledge extending along the width of the frame with an aperture therethrough to receive the threaded rod extending from the housing assembly.

To permit the rod 202 to extend therethrough, the mounting member 120 includes an opening 121 therein. As shown in FIGS. 3, 4 and 7, the rod 202 can include a sleeve portion 123 disposed around the rod 202 for providing reduced friction interaction between the rod 202 and the mounting member 120. The sleeve portion 123 includes a smooth outer surface for reducing friction as the rod 202 shifts through the opening 121 of the mounting member 120. The sleeve portion 120 further includes a threaded interior surface for engaging the threaded outer surface of the rod 202. Finally, the sleeve portion 123 can be secured on the rod 202 by securing members 125, such as bushings or nuts.

As shown in FIG. 1, the spring 204 is disposed about a portion of the rod 202 and positioned adjacent the portion of the mounting frame 100 through which the rod 202 extends. The spring 204 of the biasing mechanism 200 provides an upward bias on the housing assembly 300 such that belt scrapers 18 attached to the elongate member 16 are biased into engagement with the belt 20.

The spring 204 is held in place by a securing or retaining member, such as a nut 206, threaded on the rod 202 opposite the portion of the mounting frame 100 through which the rod 202 extends. The fastener 206 is adjustable along the length of the rod 202 so as to adjust the elongate support member 16. The fastener 206 is located on the rod 202 such that, with no loading on the belt 20, the scrapers 18 are in contact with the lower surface of the belt 20. By further adjusting the location of the fasteners the bias force applied to the belt 20 by the scrapers 18 is increased or decreased. As shown in FIGS. 2-7, the rod 202 has a threaded exterior surface 203 and the fastener 206 has a corresponding threaded inner surface.

Figure 2:
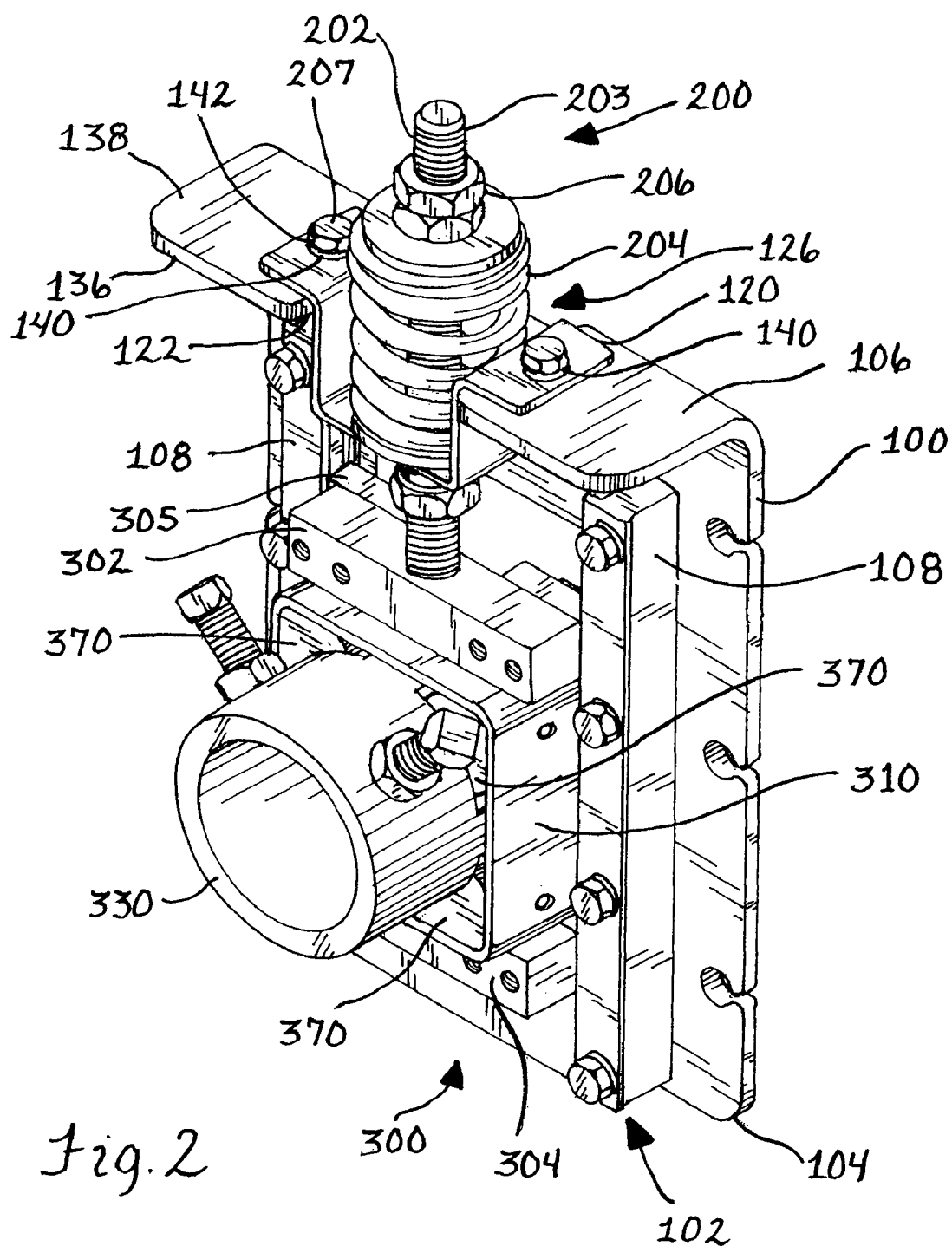
FIG. 2 is a perspective view of the spring tensioner unit of FIG. 1 in the pull-up configuration showing the spring tensioner unit having a notch within the shelf of the mounting frame, a bracketed mounting member positioned in the notch and a cylindrical inner surface of the inner housing of the housing assembly.
Figure 6:
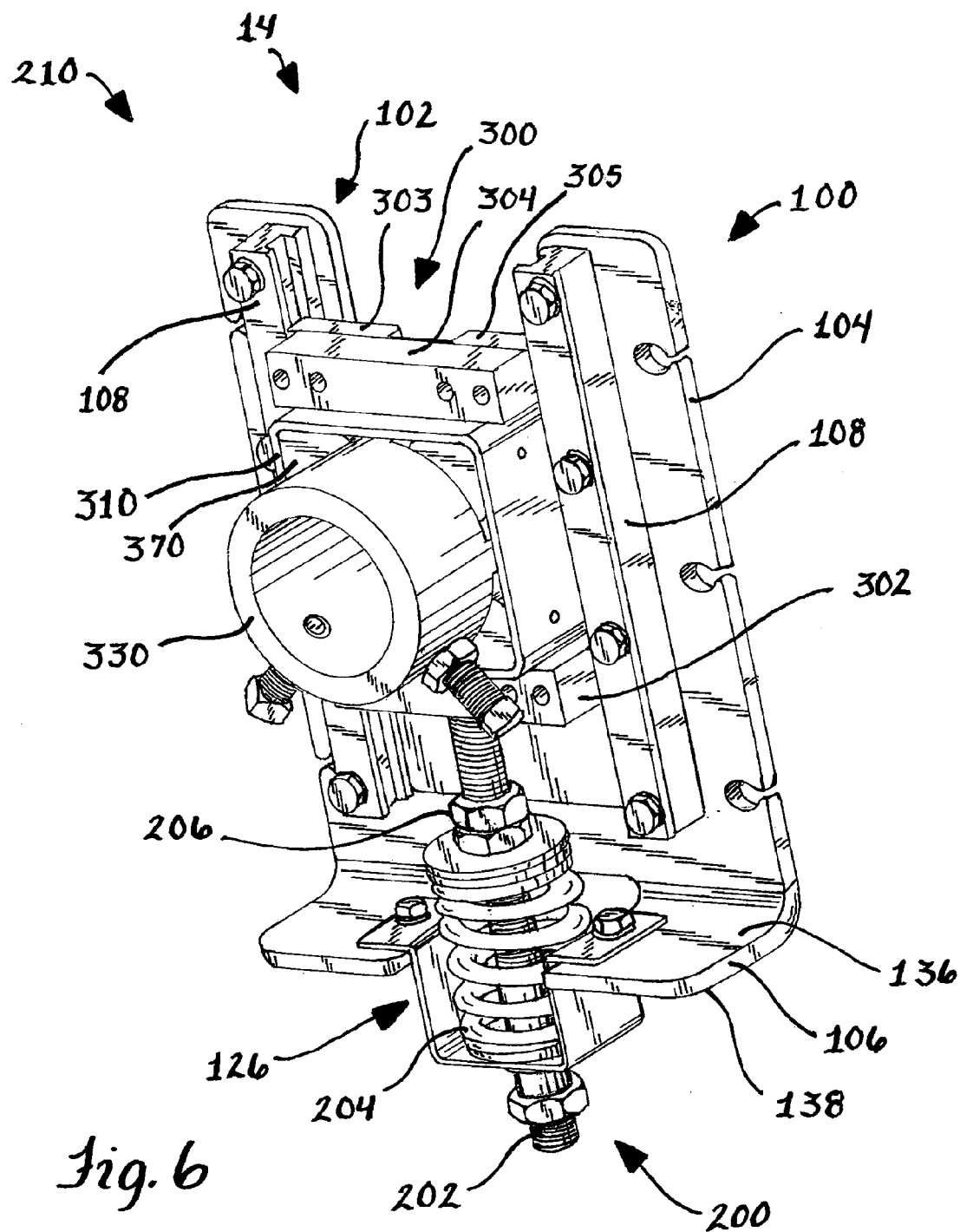
FIG. 6 is a perspective view of the spring tensioner of FIG. 1 in the push-up configuration showing the spring positioned between the housing assembly and bracketed mounting member.

As shown in FIGS. 2 and 6, the spring tensioner 14 has a pull-up configuration 208 and a push-up configuration 210. In the pull-up configuration 208, as shown in FIGS. 2-5, the biasing mechanism 200 is configured such that the mounting member 120 of the shelf 106 is closest to the housing assembly 300, with the spring 204 disposed about the rod 202 and positioned adjacent to and supported by the mounting member 120 with the fastener 206 positioned adjacent the distal end of the rod 202. In the push-up configuration 210, as shown in FIGS. 6 and 7, the fastener 206 is positioned about the rod 202 adjacent to the housing assembly 300. The spring 204 is positioned about the rod 202 between the fastener 206 and the mounting member 120 of the mounting frame 100.

The detachable connection between the mounting member 120 and the shelf 106 allows for easy reconfiguration of the spring tensioner 14 from the pull-up configuration 208 to the push-up configuration 210 and vice-versa. In particular, neither the rod 202 or the housing assembly 300 of the spring tensioner 14 require reconfiguration or removal to transition the spring tensioner 14 from the push-up configuration 210 to the pull-up configuration 208 or vice-versa. Reconfiguration is achieved by removing the fastener 206, spring 204, and mounting member 120 and repositioning the mounting member 120, spring 204 and fastener 206 about the rod 202 in an order reverse to which they were removed.

In another aspect of the invention, the spring tensioner units 14 are configured to be compact in size. The size of a spring tensioner unit 14 is determined based on several criteria, including the size of the mounting frame 100, the length of the rod 202 of the biasing mechanism 200, and the size of the housing assembly 300. In particular, the height of the mounting frame 100 is determined by factors including the distance 144 between the shelf 106 of the mounting frame 100 and the guides 108 for slideably mounting the housing assembly 300 onto the mounting frame 100. Additionally, the dimensions of the spring tensioner unit 14 are affected by the dimensions of the rod 202, the spring 204, the fastener 206, and the inner housing 330 of the housing assembly 300.

The mounting plate 104 has a predetermined height 112 and width 114. The shelf 106 has a superior surface 138, an inferior surface 136 and extends transversely along the width of the mounting plate 104. Preferably, the shelf 106 extends transversely a distance 118 less than the width 114. In one embodiment, the mounting plate 104 has a width 112 such as 9.5 inches and a height 114 such as 12.75 inches, with the shelf 106 extending transversely a distance 118, such as less than 4.75 inches. Further, the shelf 106 and the guides 108 are spaced a predetermined distance 144 from one another, as will be discussed further below.

Figure 10:
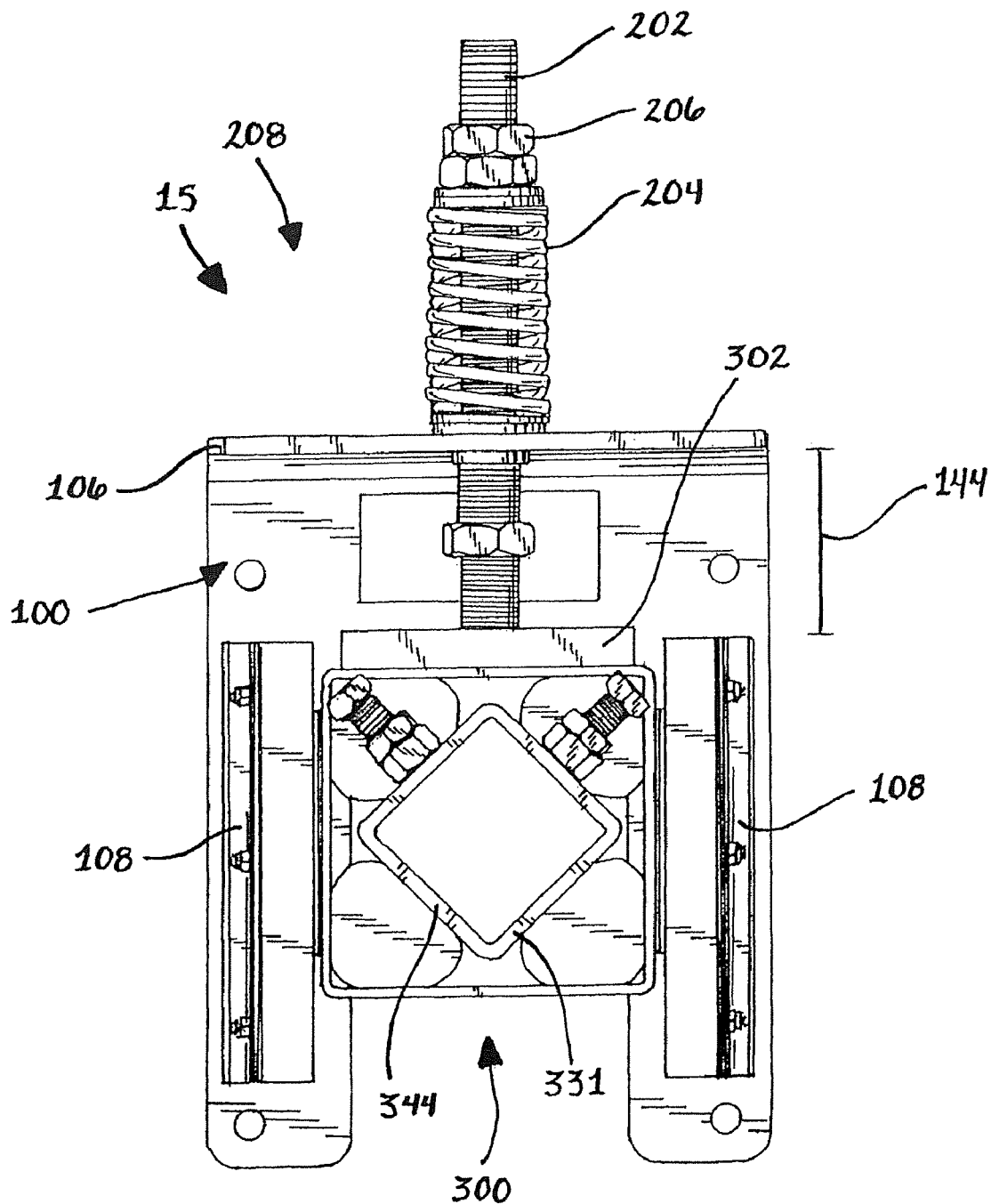
FIG. 10 is a front elevational view of the prior art spring tensioner unit of FIG. 8 in the pull-up configuration showing the flat outer surfaces of the inner housing, the distance between the rails and ledge of the spring tensioner unit and the distance the threaded rod extends above the ledge.
Figure 11:
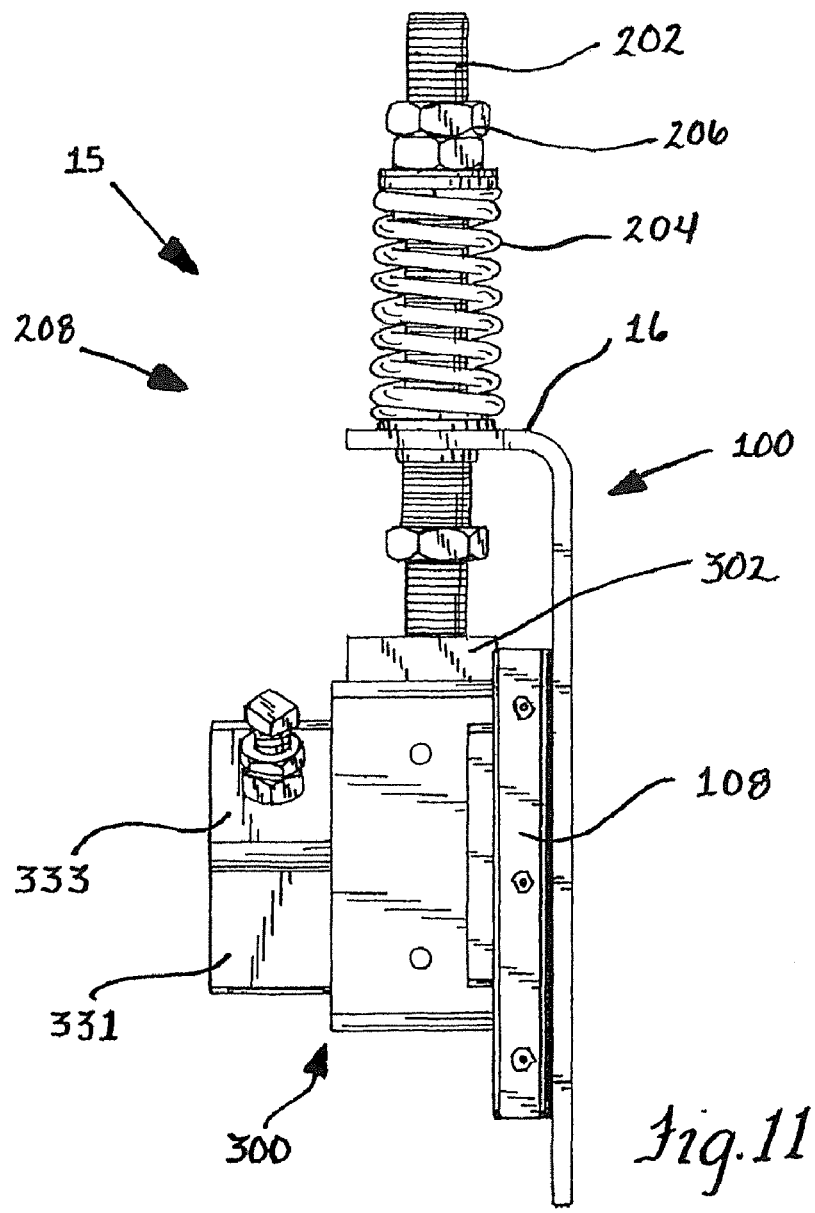
FIG. 11 is a side elevational view of the prior art spring tensioner unit of FIG. 8 in the pull-up configuration.

As shown in FIGS. 3 and 10, the length of the rod 202 is determined based on the pull-up configuration 208. In particular, the length of the rod 202 is selected such that the rod 202 must extend beyond the shelf 106 a distance sufficient to permit attachment of the spring 204 and fastener 206 thereto in the pull-up configuration 208.

Figure 12:
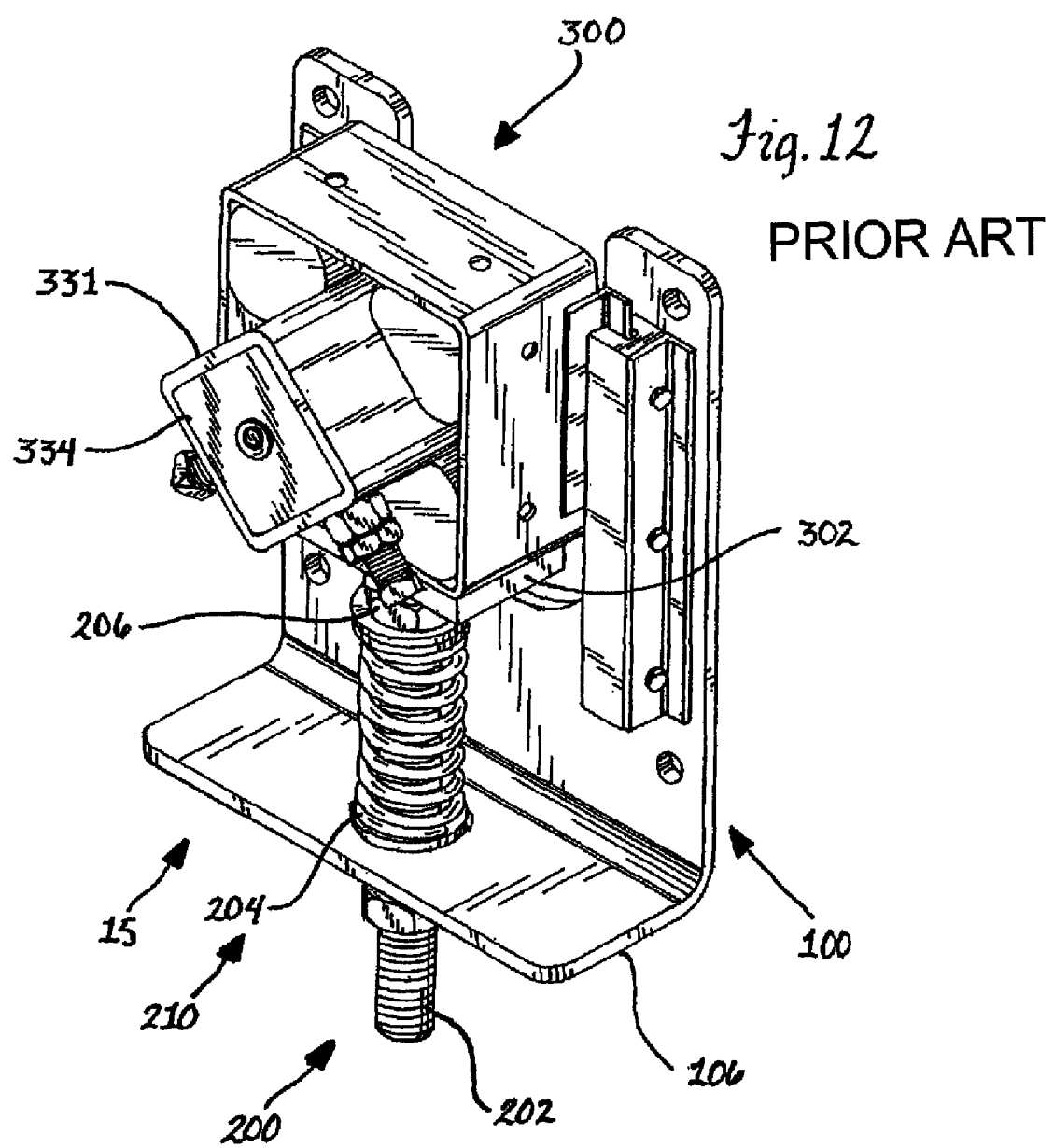
FIG. 12 is a perspective view of the prior art spring tensioner unit of FIG. 8 in the push-up configuration showing the spring located between the housing assembly and the ledge of the mounting frame.

In addition, as shown in FIGS. 7 and 12, the distance 144 between the shelf and the guides 108 of the mounting frame 100 is based on the push-up configuration 210. The necessary distance 144 between the guides 108 and the shelf 106 is determined so as to permit both the spring 204 and the fastener 206 to be positioned around the rod 202 and between the shelf 106 and the guides 108.

As shown in FIGS. 1-7, the size of the spring tensioner 14 can be reduced by configuring the mounting member 120 to include a bracket or step configuration 126. As shown in FIGS. 3 and 7, the mounting member configuration includes two vertical sections 128 oriented parallel to one another, the vertical sections 128 connected at one end by a horizontal section 130, the horizontal section 130 extending between and perpendicular to both of the vertical sections 128, and a pair of outwardly extending flanges 132 and 134. The flanges 132 and 134 extend perpendicular to and outwardly from the end of each of the vertical sections 128 opposite the horizontal section 130.

Additionally, as described above, the shelf 106 has an opening 122 configured to receive the mounting member 120 therein. In particular, the opening 122 is configured to receive the vertical sections 128 of the mounting member 120, with the outwardly extending flanges 132 and 134 engaging the shelf 106. The flanges 132 and 134 of the mounting member 120 are configured to be detachably connected to the shelf 106.

In the pull-up configuration 208, as shown in FIGS. 2-5, the flanges 132, 134 are detachably connected to the superior surface 138 of the shelf 106 of the mounting frame 100, with the vertical sections 128 extending through the opening 122. The spring 204 is oriented around the rod 202, adjacent to the horizontal section 130 of the mounting member 120, and positioned between the vertical sections 128 of the mounting member 120. The spring 204 is captured on the rod 202 between the first horizontal section 130 of the mounting member 120 and the fastener 206.

As a result of the bracket configuration 126, the required length of the rod 202 is decreased by an amount corresponding to the length of the vertical sections 128 of the mounting member 120. As shown in FIGS. 3 and 10, the bracket configuration 126 results in the spring 204 and fastener 206 being positioned closer to the housing assembly 300 than if the mounting member 120 did not include the bracket configuration 126. As a result of the spring 204 and the fastener 206 being positioned closer to the housing assembly 300, the rod 202 extending from the housing assembly 202 need not extend as far to allow both the spring 204 and fastener 206 to be disposed about the rod 202 while the spring tensioner 14 is in the pull-up configuration 208.

Alternatively, in the push-up configuration 210, as shown in FIGS. 6 and 7, the flanges 132, 134 of the mounting member 120 are detachably connected to the inferior surface 136 of the shelf 106 of the mounting frame 100. The vertical sections 128 of the mounting member 120 extend through the opening 122 of the shelf 106 away from the housing assembly 206. As shown in FIGS. 6, 7 and 12, the spring 204 and fastener 206 are disposed about the rod 202 between the mounting member 120 and the housing assembly 300. In particular, the spring 204 is oriented around the rod 202, adjacent to the horizontal section 130 of the mounting member 120, and positioned between the vertical sections 128 of the mounting member 120. The spring 204 is captured on the rod 202 between the horizontal section 130 of the mounting member 120 and the fastener 206.

As a result of the bracket configuration, the spring 204 extends through the opening 122 of the shelf 106 of the mounting frame 100. The distance 144 requirement determined by the fastener 206 and spring 204 can be accounted for by not only the distance 144 between the guides 108 and the shelf 106, but also the vertical sections 128 of the mounting member 120. As a result, the height of the mounting frame 100, and in particular the distance 144 between the guides 108 and the shelf 106 can be reduced by an amount corresponding to the vertical sections 128 of the mounting member 120.

Therefore, the length of the vertical sections 128 of mounting member 120 is taken into account when configuring the dimensions of the mounting frame 100 and the rod 202. The vertical sections 128 act to reduce the necessary dimensions of the mounting frame 100 and the rod 202. In the push-up configuration 210, the distance 144 required between the shelf 106 and the guides 108 of the mounting frame 100 can be reduced by an amount equal to the length of the vertical sections 128 of the mounting member 120. In the pull-up configuration 208, the length of the rod 202 can be reduced by an amount equal to twice the length of the vertical sections 128 of the mounting member 120. Half of the reduction can be accounted for by the bracket 120 as discussed above. The remainder of the rod 202 length reductions can be attributed to the decreased distance 144 between the guides 108 and the shelf 106, which in turn decreases the necessary length for the rod 202 to extend from the housing assembly 300 and through the opening 122 of the mounting frame 100. Therefore, the length of the vertical sections 128 results in an overall decrease in the dimensions of the spring tensioner unit 14 equal to at least twice the length of the vertical sections 128, based on the reduction in the size of the mounting frame 100 and a corresponding reduction in length of the rod 212.

In another embodiment, as shown in FIGS. 13-24, the housing assembly 300 can be configured to provide a compact housing assembly configuration which, in turn, allows for the mounting frame 100 to have a reduced width and height.

The housing assembly 300, as shown in FIGS. 17-21, includes an outer housing 310, an inner housing 330 and a plurality of resilient members 370. The outer housing 310 is configured to be slideably mounted to the guides 108 of the mounting frame 100. As shown in FIGS. 13-16, the outer housing 330 has four sides 316 with rounded corners 318. The outer housing 310 is sized to be compact yet sufficiently large to permit the inner housing 330 and resilient members 370 to be located therein. As such, the size of the outer housing 310 is dependent on the size of the inner housing 330 and the resilient members 370.

The outer housing 310, as shown in FIGS. 13-15, includes an inner surface 312 for being engaged by the resilient members 370 and extending around the inner housing 330. The inner housing 330 and outer housing 310 are kept from engaging one another by the plurality of resilient members 370 positioned between the outer surface 350 of the inner housing 330 and the inner surface 312 of the outer housing 310. An outer surface 314 of the outer housing 310 is configured to have upper and lower guide blocks 302 and 304 mounted thereon. The slide members 303 and 305 of the upper and lower guide blocks 302 and 304 are configured to engage the guides 108 of the mounting frame 100 and connect to the biasing mechanism 200. As shown in FIGS. 13 and 16, the upper and lower guide blocks 302 and 304 of the outer housing 310 each include an aperture 320 configured to receive the rod 202 of the biasing mechanism 200.

The inner housing 330 is configured to provide a secure mount for the elongate member 16 and the thereto affixed belt scrapers 18. As shown in FIGS. 22-24, the inner housing 330 of the housing assembly 300 includes a cylindrical inner surface 342 configured to receive the elongate member 16. The cylindrical inner surface 342 of the inner housing 330, as compared to a parallelogram-shaped inner surface 344 in the prior art, provides a larger surface area in which to engage the elongate member 16. By increasing the engageable surface area of the inner housing 330 with a cylindrical surface 342, and thereby the ring strength of the clamping surface, the elongate member 16 can be more firmly secured within the inner housing 330.

As shown in FIGS. 8-12, the prior art spring tensioner 15 included an inner housing 331 have a uniform outer surface 333 along its length. In contrast, as shown in FIGS. 22-24, the inner housing 330 of the present invention includes a supported outer surface portion 350 configured to be received in the outer housing 310 and a distal outer surface portion 352 for positively securing the elongate support member 16 to the inner housing 330. As shown in FIGS. 22 and 24, the distal outer surface portion 352 of the inner housing 330 includes a plurality of apertures 336. The apertures 336, which are preferably threaded, are sized to receive a securing member 338, such as a set screw, which engages and secures the elongate member 16 within the inner housing 330. In one embodiment, the thickness 340 of the inner housing 330 not located within the outer housing 310 is 0.5 inches.

As shown in FIGS. 17-24, the supported outer surface portion 350 of the inner housing 330 is configured to be positioned within the outer housing 310 and held in place by a plurality of resilient members 370. The supported outer surface 350 and the resilient members 370 are configured to mitigate and/or minimize engagement between the inner housing 330 and the outer housing 310 as the inner housing 330 rotates with the movement of the elongate member 16 rotates along its longitudinal axis. As discussed above, any increase in the size of the supported outer surface portion 350 of the inner housing 330 results in a corresponding increase in size of the outer housing 310, and therefore the housing assembly 300 overall. Additionally, any increase in the dimensions of the housing assembly 300 results in a corresponding increase in the size of the mounting frame 100.

As shown in FIGS. 22-24, the distal end portion 352 of the inner housing 350 has an annular outer surface 353 with a generally constant thickness. In contrast, the supported portion 350 of the inner housing 330 positioned within the outer housing 310 has an wall 346 of varying thicknesses, the wall 346 being a substantially cylindrical wall with portions removed therefrom, wherein the portions removed result in the wall having flat portions 358 thereon. As shown in FIGS. 22-24, the supported portion 350 can include four flat portions 358, however, more or fewer flat portions 358 are contemplated. Preferably, the inner housing 330 is oriented such that the thinnest sections of the non-cylindrical outer surface 356 are positioned adjacent to the corners 318 of the outer housing 310.

Figure 17:
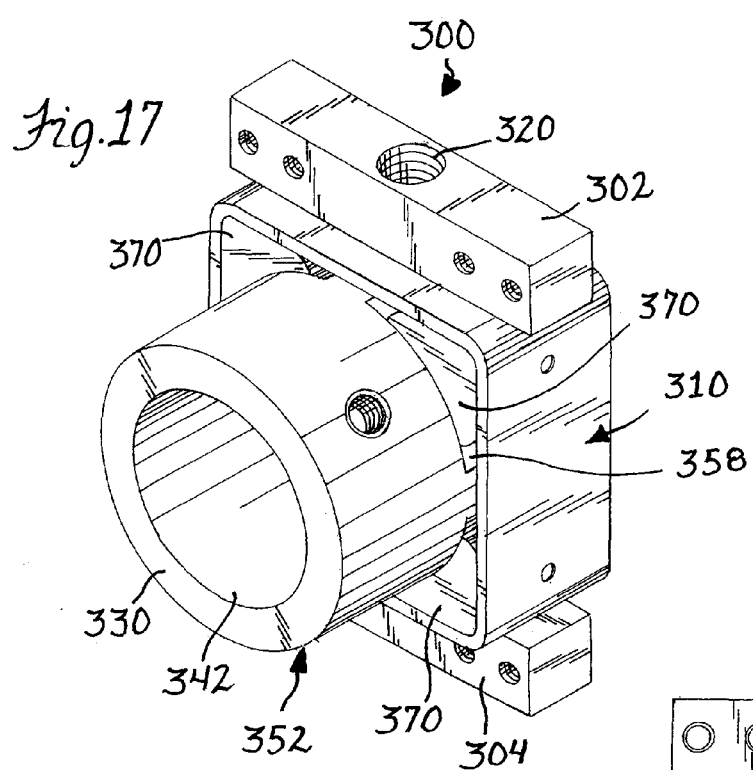
FIG. 17 is a perspective view of the housing assembly of the spring tensioner of FIG. 1 showing the inner housing, the outer housing, and the resilient members positioned between the inner and outer housings.
Figure 18:
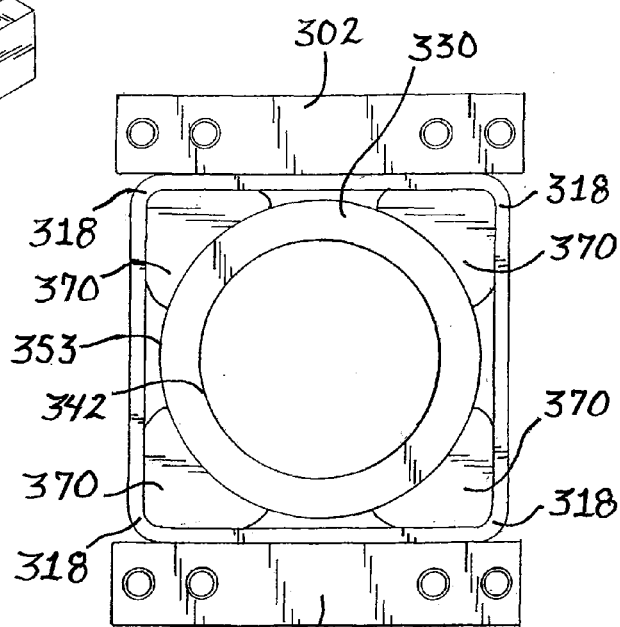
FIG. 18 is a front elevational view of the housing assembly of the spring tensioner of FIG. 1 showing the annular inner surface of the inner housing.

The resilient members 370 are positioned between outer housing 310 and the inner housing 330 so that the inner housing 330 does not engage the outer housing 310. The resilient members 370 are formed to distribute any force on the inner housing 330 to the stronger, thicker sections of the inner housing 330. Preferably, the resilient members 370 are formed to engage the inner housing 330 and the outer housing 310. As shown in FIGS. 17 and 19, the resilient members 370 are positioned adjacent the flat or thin sections 358 of the inner housing 330.

The supported portion 350 of the inner housing 330 and the outer housing 310 are configured to resist migration of the resilient members 370. The resilient members 370 are sized to be compressed between the inner housing 330 and outer housing 310 after installation. As shown in FIGS. 22 and 24, to resist migration of the resilient members 370 the flat sides 358 of the supported portion 350 include grooves 359 therein. The grooves 359 are configured to be engaged by and receive a portion of the compressed resilient members 370. The sharp corners 361 of the grooves 359 engage the resilient members 370 and tend to keep the resilient member 370 from sliding relative to the outer and inner housings 310 and 330. Additionally, as shown in FIGS. 13 and 14, the outer housing 310 includes detents 363 extending from the inner surface 312. The detents 363 are positioned to engage the resilient members 370 and resist or mitigate migration of the resilient members relative to the outer and inner housings 310 and 330.

In one embodiment of the invention, the depth of the inner housing 354 depends on the torsion resistance qualities of the resilient members 370. Particularly, as the resilient members 370 have increased torsion resistance, the required depth of the inner housing 354 will decrease. Preferably, the depth of the inner housing 354 is at least 3 inches, more preferably at least 4.5 inches deep.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A belt cleaner apparatus comprising:
a frame for a conveyor belt;
an elongate member for extending below and across the conveyor belt;
a belt scraper operatively mounted to the elongate member and biased into engagement with the overlying conveyor belt;
a pair of tensioner units, one at each end of the elongate member for biasing the elongate member and the belt scraper upwardly toward the conveyor belt;
a mounting frame member of each of the tensioner units for mounting the tensioner units to the conveyor belt frame; and
a detachable portion of the mounting frame member that is removed from the mounting frame member to allow the tensioner units to be reconfigured to bias the elongate member upwardly in either a push-up configuration or a pull-up configuration,
wherein the tensioner units each include a spring member, and the detachable portion of the mounting frame member is a spring mount against which one end of the spring member abuts.

2. The belt cleaning apparatus of claim 1, wherein the detachable portion is a bracket member and the mounting frame member includes a notch opening sized to receive the bracket member.

3. The belt cleaning apparatus of claim 1, wherein the tensioner units each include a housing assembly to which a corresponding end of the elongate member is secured with the housing assembly mounted to the corresponding mounting member for linear translation therealong, a rod fixed to the housing assembly, a coil spring supported by the mounting member detachable portion and extending about the corresponding rod for providing an upward bias force to the housing assembly.

4. The belt cleaning apparatus of claim 3, wherein the tensioner units include a fastener on the rod for being shifted therealong with the spring captured between the fastener and the mounting member detachable portion so that shifting the fastener along the rod adjusts the bias force applied to the housing assembly by the spring.

5. The belt cleaning apparatus of claim 4, wherein the rod is threaded and the fastener is an adjustment nut threaded on the rod.

6. A spring tensioner device for biasing a support pole of a belt cleaner apparatus upwardly toward a conveyor belt, the spring tensioner device comprising:
a housing assembly for supporting the pole;
a mounting plate for the housing assembly;
a linear guide device on the mounting plate for guiding translation of the housing assembly along the mounting plate;
a biasing mechanism for urging the housing assembly linearly upward along the plate;
a mounting member connected to the mounting plate for supporting the biasing mechanism; and
a detachable connection between the mounting member and the mounting plate to allow the mounting plate, the mounting member and biasing mechanism to be reconfigured to bias the housing assembly upward in either a push-up configuration or a pull-up configuration;
wherein the mounting plate includes a transverse shelf portion to which the mounting member is removably connected via the detachable connection, and the biasing mechanism includes a spring member that extends above and below the traverse shelf portion in both push-up and pull-up configurations for minimizing space requirements for the spring tensioner device.

7. A spring tensioner device for biasing a support pole of a belt cleaner apparatus upwardly toward a conveyor belt, the spring tensioner device comprising:
a housing assembly for supporting the pole;
a mounting plate for the housing assembly;
a linear guide device on the mounting plate for guiding translation of the housing assembly along the mounting plate;
a spring biasing mechanism for urging the housing assembly linearly upward along the plate;
a mounting member connected to the mounting plate for supporting the spring biasing mechanism; and
a detachable connection between the mounting member and the mounting plate to allow the mounting plate, the mounting member and the spring biasing mechanism to be reconfigured to bias the housing assembly upward in either a push-up configuration or a pull-up configuration.

8. The spring tensioner device of claim 7 wherein the mounting member includes a step and the mounting plate includes an opening sized to receive the step therein.

9. The spring tensioner device of claim 7 wherein the spring biasing mechanism includes a spring biasing member and a rod extending from the housing assembly through the mounting member with the spring biasing member operable to bias the rod and housing assembly upwardly.

10. The spring tensioner device of claim 9, wherein the spring biasing member is a coil spring, the rod is threaded, the coil spring extends about the threaded rod, and the spring biasing mechanism includes a nut threaded on the rod to capture the coil spring between the mounting member and the nut.

11. A belt cleaner apparatus comprising:
a frame for a conveyor belt;
an elongate member for extending across the conveyor belt;
a belt scraper operatively mounted to the elongate member biased into engagement with the conveyor belt;
a torsion biasing unit at either end of the elongate member for generating a torsion bias force on the elongate member;
a housing assembly of each of the torsion biasing units including an inner tubular member, an outer housing member extending about the tubular member, and a plurality of resilient torsion biasing members between the outer housing member and inner tubular member; and
the inner tubular member configured to be secured to the elongate member and having a cylindrical inner surface for supporting the elongate member extending therein.

12. The belt cleaning apparatus of claim 11, wherein the tubular member has a non-cylindrical outer configuration along a portion thereof within the outer housing member.

13. The belt cleaning apparatus of claim 11, wherein the tubular member has an outer surface including flat portions thereof and the resilient torsion biasing members are positioned between the flat portions and the outer housing member.

14. The belt cleaning apparatus of claim 11, wherein the tubular member has an annular wall with a varying thickness, and the resilient torsion biasing members are configured to extend into engagement along both thin and thicker portions of the annular wall to distribute the torsion bias force thereacross.

15. The belt cleaning apparatus of claim 11, wherein the outer housing member has a substantially square configuration with four sidewalls and the inner tubular member has an outer surface including four flat surface portions equally spaced about the outer surface and positioned within the square outer housing member and extending transverse to the sidewalls thereof with the resilient members being positioned between the flat surface portions and the sidewalls.

16. The belt cleaning apparatus of claim 11, wherein the inner tubular member has a protruding securing portion extending beyond the outer housing member, the securing portion configured to be secured to the elongate member.

17. A torsion biasing device for a belt cleaner apparatus including a support pole extending across a conveyor belt, the torsion biasing device comprising:
- a substantially outer square outer housing including four sidewalls;
- an inner tubular member for supporting the pole therein, the inner tubular member including a mounting portion and a protruding securing portion;
- a connection for securing the pole to the protruding securing portion of the inner tubular member;
- resilient biasing members between the outer housing sidewalls and mounting portion of the inner tubular member; and
- a varying thickness annular wall of the mounting portion of the inner tubular member.

18. The torsion biasing device of claim 17, wherein the square outer housing has four corners, and the annular wall has thin portions adjacent to the corners with the resilient biasing members therebetween to keep the size of the outer housing to a minimum.

19. The torsion biasing device of claim 17, wherein the annular wall has an outer surface with a predetermined configuration and an inner surface with a predetermined configuration different from that of the outer surface.

20. The torsion biasing device of claim 19, wherein the inner surface is cylindrical and the outer surface includes flat surface portions.

21. The torsion biasing device of claim 17, wherein the inner tubular member has an inner cylindrical surface for supporting the pole.

22. The torsion biasing device of claim 17, wherein the annular wall has an outer surface with flat portions thereof.

23. A method of reconfiguring a spring tensioner unit for a conveyor belt cleaner between pull-up and push-up configurations thereof, the method comprising:
- removing a retainer from an elongate rod of the unit;
- removing a spring from the rod;
- removing a spring support member from a wall of the unit so that the rod extends through a gap in the wall of the unit;
- reorienting the unit so that the rod is shifted from extending in one direction to extend in an opposite direction;
- mounting the spring to the rod without requiring that the rod be removed from the unit; and
- reattaching the spring support member to the unit wall and retainer to the rod.

24. The method of claim 23, wherein the unit is reoriented by reorienting the rod from extending in one of an upward and downward direction from a housing assembly that supports an elongate member extending across a conveyor belt to the other of the upward and downward direction.

25. The method of claim 23, wherein reattaching the spring support member to the unit wall includes connecting the spring support member on either side of the gap in the unit wall and fitting the rod into a clearance opening in the spring support member to extend therethrough.

26. The method of claim 23 wherein the spring support member is removed from the wall before the spring is removed from the rod.

27. The method of claim 23 wherein the spring is mounted to the rod after the spring support member is reattached to the unit wall.

\* \* \* \* \*